(12) United States Patent
Craig et al.

(10) Patent No.: US 8,087,145 B2
(45) Date of Patent: Jan. 3, 2012

(54) ALIGNMENT TOOL APPARATUS AND METHOD

(75) Inventors: Brent F. Craig, Seattle, WA (US); Eric M. Reid, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1131 days.

(21) Appl. No.: 11/377,548

(22) Filed: Mar. 17, 2006

(65) Prior Publication Data

US 2007/0226981 A1    Oct. 4, 2007

(51) Int. Cl.
    *B23Q 3/00* (2006.01)
(52) U.S. Cl. .......... 29/468; 29/559; 29/281.6; 29/281.5; 269/21; 269/27; 269/37
(58) Field of Classification Search .................... 29/464, 29/466, 468, 559, 281.5, 281.4, 281.6, 283, 29/701, 702, 706, 707, 708, 709; 269/20, 269/21, 27, 37, 40, 45
    See application file for complete search history.

(56) References Cited

U.S. PATENT DOCUMENTS

| | | | |
|---|---|---|---|
| 3,804,397 A | 4/1974 | Neumann | |
| 5,181,307 A * | 1/1993 | Kitahama et al. | ............... 29/434 |
| 5,722,646 A | 3/1998 | Soderberg et al. | |
| 5,820,116 A * | 10/1998 | Haese | .............................. 269/21 |
| 5,894,705 A | 4/1999 | Sutton | |
| 6,463,644 B1 * | 10/2002 | Pasque | ......................... 29/281.4 |
| 6,701,596 B2 | 3/2004 | Kloepfer et al. | |
| 6,708,393 B1 * | 3/2004 | Roy et al. | ......................... 29/714 |
| 6,796,014 B2 * | 9/2004 | Sarh | .......................... 29/407.09 |
| 7,039,995 B2 * | 5/2006 | Thompson | .................... 29/281.5 |
| 7,310,865 B2 * | 12/2007 | Cole et al. | ..................... 29/281.5 |

FOREIGN PATENT DOCUMENTS

| | | |
|---|---|---|
| DE | 1161519 | 1/1964 |
| DE | 202004013157 U1 | 1/2006 |
| GB | 2323585 A | 9/1998 |
| WO | WO 99/42244 | 8/1999 |
| WO | WO 02/085575 A2 | 10/2002 |
| WO | WO 02/085575 A3 | 10/2002 |

* cited by examiner

*Primary Examiner* — David Bryant
*Assistant Examiner* — Christopher Koehler

(57) ABSTRACT

An alignment apparatus and method for aligning work pieces. The alignment apparatus includes a base member and at least on adjustable leg that extends from the base member. The alignment apparatus additionally includes a vacuum plate mounted to the adjustable leg. The alignment apparatus also has a an actuator mounted to the base member wherein the actuator includes a shaft extending therefrom. The alignment apparatus includes an attachment member connected to the shaft.

13 Claims, 3 Drawing Sheets

ALIGNMENT TOOL APPARATUS AND METHOD

FIELD OF THE INVENTION

The present invention relates generally to an alignment tool for the relative movement and/or alignment of two work pieces or the like. More particularly, the present invention relates to a floor alignment tool apparatus and method for use in the manufacture and assembly of a commercial aircraft, for example, that functions to align the aircraft fuselage and floor beams at predetermined or preferred positions during aircraft assembly.

BACKGROUND OF THE INVENTION

Commercial aircraft have been traditionally assembled by using techniques that utilize multiple tooling. These multiple tooling techniques were utilized to locate the various parts and components that make up the fuselage and body sections of the commercial aircraft, so that the parts fit together correctly during assembly. These types of assembly techniques using multiple tooling to locate the various parts, proved to be costly. Accordingly, some commercial aircraft manufacturers and the like, adopted an alternative, more cost effective assembly philosophies, such as, determinative assembly techniques, or "DA."

Determinative assembly is an alternative manufacturing philosophy or technique to traditional assembly methods and techniques wherein placement of the parts or components for attachment is preset. This preset placement is accomplished through the placement of a limited number of very accurate locating holes on each and every part, DA holes on each and every part, which are located at strategic positions on each part. The DA holes enable the components and parts of a fuselage of a commercial aircraft, for example, to be precisely pinned together during manufacture and assembly. This alternative manufacturing philosophy enables the manufacture and assembly of a commercial aircraft, for example, to be more efficient and less costly because the design and construction of locating and alignment tools, as required by the previously described manufacturing techniques, are not required.

During the assembly a commercial aircraft, for example, assembly and locating tools are used to assemble the fuselage. The fuselage skin is typically made up of a series of individual circumferential sections, or barrels, each comprising a series of 4-5 panels spliced together. Oftentimes when the fuselage is being assembled, it is required or preferred that the passenger floor grid be installed simultaneously. The individual passenger floor beams or joists of the floor grid are aligned with the fuselage skin at preset attachment locations using tooling that accurately locates the floor grid for X, Y and Z positioning. The skin panels of the fuselage are also aligned to the joists of the floor grid via the same tooling. The floor beams and the fuselage skin panels oftentimes do not line up perfectly due to misalignment or dimensional variation of the large assemblies.

Accordingly, in order to address and overcome the aforementioned misalignment between the fuselage skin and the floor joists, the tooling is employed to maneuver the various fuselage skin panels. The tooling can take various forms however generally, the tooling attaches to the frame structure of the multiple skin panels that make up circumferential sections of fuselage. The tooling is then attached to the floor joist or beam to be aligned. The tooling is then operated to move the floor joist or beam and the fuselage skin align to correct gap allowances and the commercial aircraft may be assembled. This method allows for some misalignment or dimensional variation due to allowable longitudinal gap tolerances.

The aforementioned alignment tooling does have drawbacks however due to new composite fuselage designs. New designs for large-scale fuselage sections for commercial aircraft, for example, involve the fabrication of the circumferential sections or barrels that are a single, unitary piece having no longitudinal splices like previously described designs. Accordingly, due to the fabricated, unitary design, no splice gaps exist and therefore current alignment tooling cannot attach to both the fuselage sections and the floor beams without potentially damaging the fuselage sections and/or the floor beams. Moreover, current tooling fails to provide a mechanism for monitoring and controlling the amount of force utilized to push and pull the fuselage skin and to maneuver the floor beams, which also could potentially damage the composite designs.

Accordingly, it is desirable to provide an alignment apparatus and method for moving and/or aligning work pieces or the like. More particularly, it is desirable to provide an alignment tool for the assembly of commercial aircraft, for example, that is able to facilitate the alignment of a composite fuselage section and the fuselage floor beams or joists. More particularly, it is also desirable to provide an alignment tool that attaches to a composite fuselage skin that is able to flex the fuselage skin using a controlled force, preventing the likelihood of damaging the composite skin.

SUMMARY OF THE INVENTION

The foregoing needs are met, to a great extent, by the present invention, wherein in one aspect an apparatus is provided that in some embodiments aligns work pieces or the like.

An embodiment of the present invention pertains to an alignment apparatus having a base member and at least one adjustable leg extending from the base member, wherein the adjustable leg has a first end and a second end. The alignment apparatus further includes a first vacuum plate mounted to the adjustable leg wherein the vacuum plate has a vacuum cup. The alignment apparatus additionally includes an actuator having a shaft mounted to the base along with an attachment member connected to the shaft.

Another embodiment of the present invention relates to an alignment apparatus have a base member and first and second adjustable legs which extend in opposed relation from the base member. The alignment apparatus additionally includes a first vacuum plate connected to the first adjustable leg and a second vacuum plate connected to the second adjustable leg. The alignment apparatus also includes an actuator having a shaft extending therefrom, which is mounted to the base member. The shaft has an attachment member connected to it.

Yet another embodiment of the present invention refers to a method for aligning work pieces of the like, comprising the steps of: mounting an alignment apparatus to a first work piece to be aligned, wherein the alignment apparatus comprises a base member; a first adjustable leg having a first end and a second end, that extends from the base member; a second adjustable leg having a third end and a fourth end that extends from the base member, wherein the first adjustable leg and said second adjustable leg extend in opposed relation to one another; a first vacuum plate connected to the first adjustable leg; a second vacuum plate connected to the second adjustable leg; a pneumatic cylinder mounted to the base member, wherein the pneumatic cylinder comprises a shaft extending therefrom; and an attachment connected to the shaft, wherein the step of mounting is achieved via the step of applying a vacuum force to the first and second vacuum plates; attaching the attachment of the alignment apparatus to a second work piece to be aligned; applying a desired movement force to the attachment member; regulating said application of the vacuum force to the vacuum cups; and controlling said application of the movement force to the attachment member.

In still another embodiment of the present invention, an alignment apparatus is provided, comprising: means for mounting an alignment apparatus to a first work piece to be aligned, wherein the alignment apparatus comprises a base member; a first adjustable leg having a first end and a second end, that extends from the base member; a second adjustable leg having a third end and a fourth end that extends from said base member, wherein the first adjustable leg and the second adjustable leg extend in opposed relation to one another; a first vacuum plate connected to said first adjustable leg; a second vacuum plate connected to the second adjustable leg; a pneumatic cylinder mounted to the base member, wherein the pneumatic cylinder comprises a shaft extending therefrom; and an attachment member connected to the shaft, wherein said means for mounting is achieved via a means for applying a vacuum force to the first and second vacuum plates; means for attaching the attachment member of the alignment apparatus to a second work piece to be aligned; means for applying a desired movement force to the attachment member; means for regulating said application of the vacuum force to the vacuum cups; and means for controlling the application of the movement force to the attachment member.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
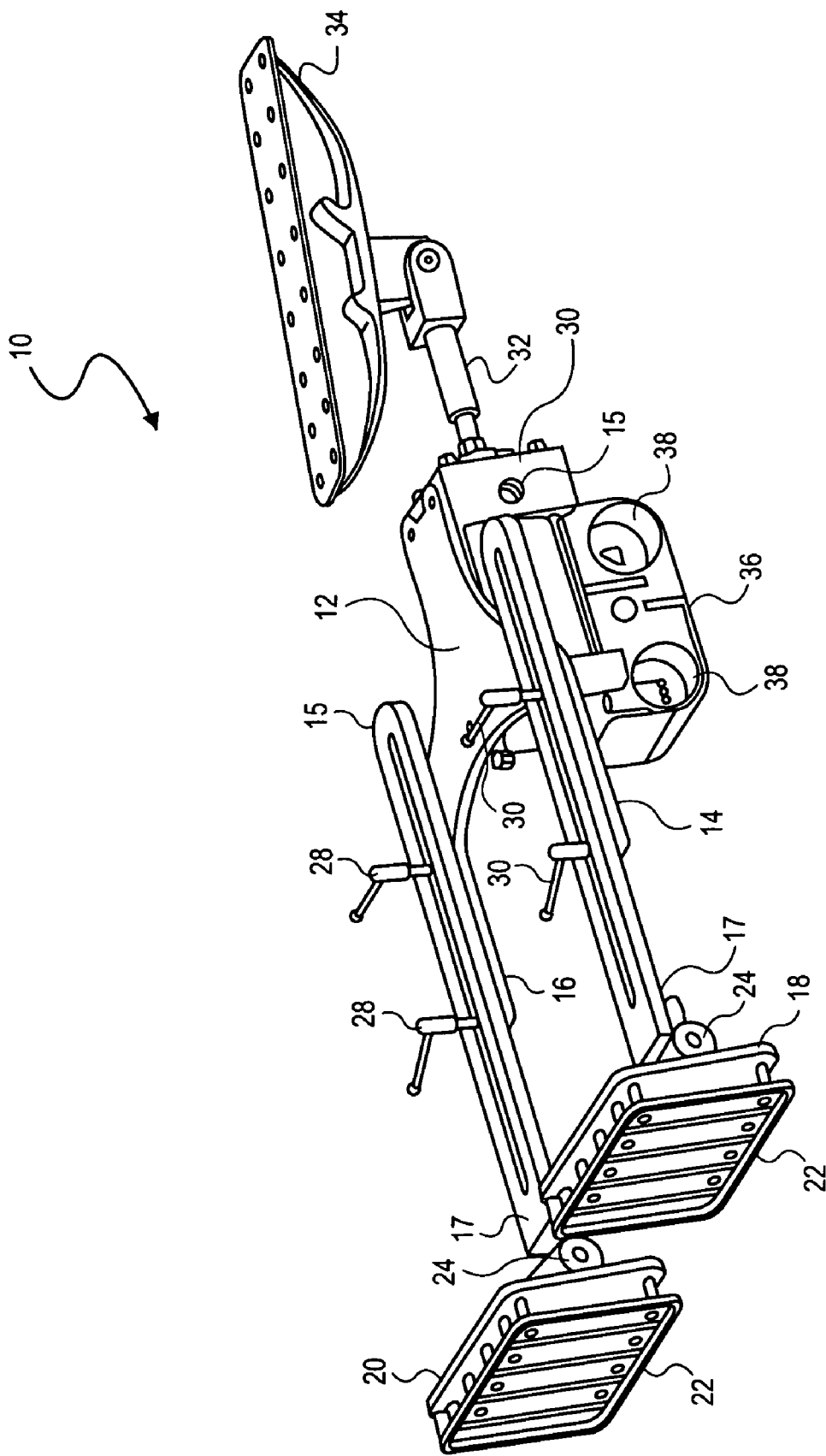
FIG. 1 is a top perspective view of an alignment tool in accordance with an embodiment of the present invention.

The invention will now be described with reference to the drawing figures, in which like reference numerals refer to like parts throughout. An embodiment in accordance with the present invention provides an alignment apparatus and method for use in the assembly of commercial aircraft or the like. More particularly, an embodiment of the present invention provides a tool that facilitates the alignment between floor joists and the composite skin of the fuselage of a commercial aircraft, for example.

Figure 2:
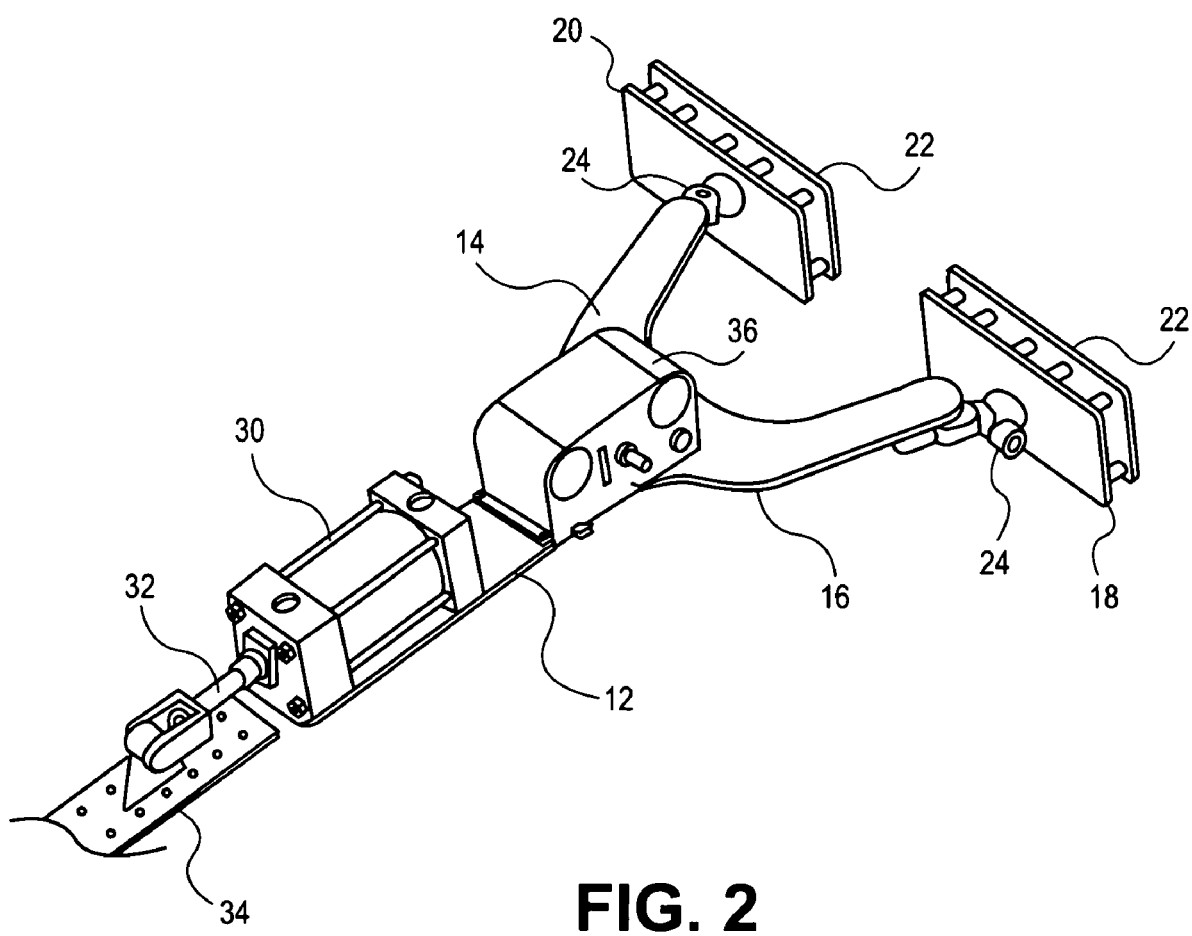
FIG. 2 is a top perspective view showing the lower or bottom portion of the alignment tool depicted in FIG. 1, in accordance with an embodiment of the present invention.

Referring now to FIGS. 1 and 2, an alignment tool, generally designated 10, in accordance with an embodiment of the present inventive apparatus and method, is illustrated. The alignment tool 10 includes a base member or portion, generally designated 12, having a first adjustable leg 14 and a second adjustable leg 16, each extending outwardly from the base portion 12 in opposed relation to one another. The adjustable legs 14, 16 each have first and second ends, 15, 17, respectively. As illustrated in FIGS. 1 and 2, the alignment tool 10 has a first vacuum plate 18 mounted to the first adjustable leg 14 and a second vacuum plate 20 mounted to the second adjustable leg 16. While first and second adjustable legs 14, 16 are depicted, alternative embodiments may utilize a single leg member extending from the base, for example. In such embodiments, the alignment tool and apparatus 10 would employ a single vacuum plate. Also, as illustrated in FIGS. 1 and 2, the vacuum plates 18, 20 each include a vacuum cup 22 attached thereto.

As previously mentioned, each of the vacuum plates 18, 20 is adjustably mounted to each respective adjustable leg 14, 16. In one embodiment of the present invention, the vacuum plates 18, 20 are mounted to the adjustable legs 14, 16 via spherical bearings 24 that enable the vacuum plates 18, 20 to maneuver and rotate. The vacuum plates 18, 20 may also be hingedly connected or mounted to the respective adjustable legs 14, 16, or alternatively, be rigidly connected or mounted via mechanical attachment means or methods. As previously mentioned, each vacuum plate 18, 20 includes vacuum cups 22 attached to each respective plate 18, 20, that adhere or clamp to a surface of a work piece via vacuum force.

Referring specifically to FIG. 1, each of the first and second adjustable legs 14, 16 has a slot 26 extending at least partially all the way between the first end 15 and the second end 17 of the adjustable legs 14, 16. As illustrated in FIG. 1, the base 12 includes a first pair of wing knobs or fasteners 28 that extend from the base 12 and through the slot 26 of the adjustable leg 16. The base 12 additionally includes a second pair of wing knobs or fasteners 30 that extend from the base 12, through the slot 26 of the adjustable leg 14. During operation of the alignment tool 10, the wing knobs 28, 30, in combination with the slots 26, enable and allow the respective adjustable legs 14, 16 to translate or slide along the base 12 to a desired position or length. Upon, achieving the desired position or length of the legs 14, 16, the wing knobs 28, 30 may be hand tightened to retain the desired position and length.

As depicted in FIGS. 1 and 2, the alignment tool 10 further includes an actuating means or cylinder 30 mounted to the base member 12. The actuating means or cylinder 30 includes a shaft 32 extending therefrom that is connected to an attachment member 34. The alignment apparatus 10 additionally includes a control box 36 mounted to the base member 12, adjacent the actuating means or cylinder 30.

The actuating means or cylinder 30 may be any mechanical actuating apparatus or means that is capable of actuating or driving the shaft 32. In one embodiment of the present invention, the actuating means 30 is a double action, pneumatic cylinder. In this embodiment, pressurized air, for example, shop air, may be supplied to either of side of the cylinder via conduit or the like, enabling the double action pneumatic cylinder to push and pull the shaft 32. In another embodiment of the present invention, the actuating means 30 is alternatively is a hydraulic cylinder driven by a hydraulic fluid such oil or the like. In yet another embodiment encompassed by the present invention, the actuating means 30 can be an electrical linear actuator.

Still referring to FIGS. 1 and 2, the control box 36 functions to control the push and pull forces of the actuating means 30. In the pneumatic cylinder embodiment, for example, the control box 36 regulates the amount of pressurized air flowing into the cylinder via the series of pressure gauges and switches, generally designated 38. Theses gauges may also be preset or pre-programmed so that the pneumatic cylinder 30 does not exceed a predetermined or preset force. Alternatively, in another embodiment of the present invention, the control box 30 may operate to control the flow of hydraulic fluid into the hydraulic cylinder or actuator. In yet another embodiment of the present invention, the control box 36 functions to control the flow of electricity into an electric linear actuator, for example.

Figure 3:
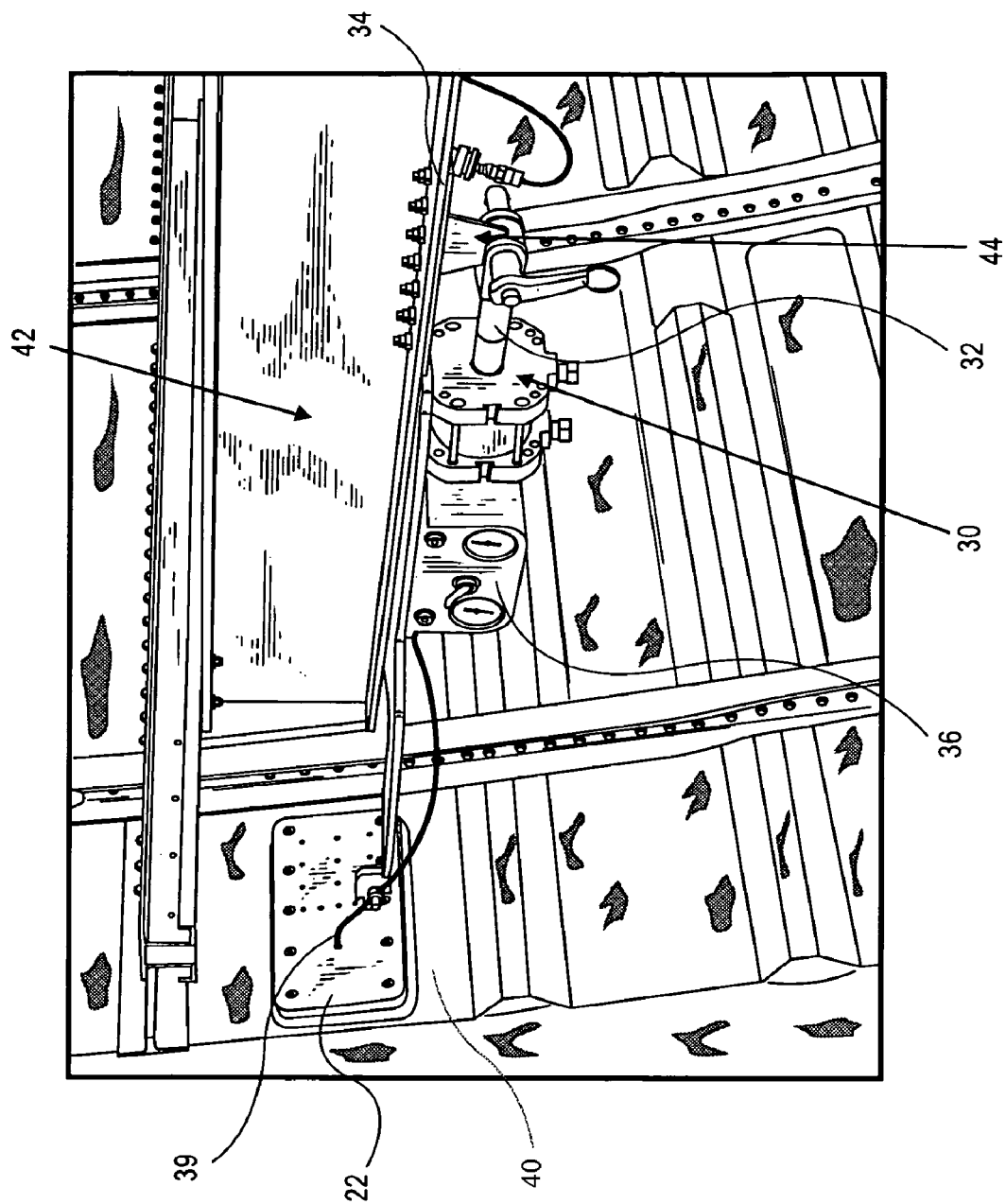
FIG. 3 is a side view of the an alignment tool during operation in accordance with an embodiment of the present invention.

The control box 36 additionally includes a venturi vacuum generator or the like, that provides a vacuum force to the vacuum cups 22 of the vacuum plates 18, 20 via the conduits 39 or like tubing, as depicted in FIG. 3. During operation of the alignment tool 10, pressurized air is provided to the control box 36 via hose or conduit. The pressurized air then proceeds to pass through the venturi vacuum generator of the control box 36, generating a vacuum force. The vacuum force is then provided to the respective vacuum plates 18, 20 and vacuum cups via the conduits 39, which enables the alignment tool 10 to attach to a fuselage skin panel or component, for example. This vacuum force may also be regulated via the gauges and switches 38, previously discussed in connection with the control box 36 and actuating cylinder or means 30.

The fastening member 34, as depicted in FIGS. 1 and 2, is connected to the shaft 32 as described above, and attaches to a work piece, such as a floor joist or beam of a fuselage of a commercial aircraft. As illustrated in FIGS. 1 and 2, the fastening member 34 includes planar piece having holes extending there through, such that bolts or pins can pass through the holes, coupling the fastening member 34 to a work piece or the like. In one embodiment of the present invention, the fastening member 34 is a clevis that integrates or attaches to a floor beam or joist via bolt attachment. In another embodiment of the present invention, the fastening member 34 may be a vacuum cup. In yet another embodiment of the present invention, the fastening member 34 may be utilized in combination with a structural member that assists to withstand axial compressive stresses, for example, a stanchion.

Referring now to FIG. 3, the alignment tool and apparatus 10 is depicted in conjunction with large fuselage sections of commercial aircraft. As illustrated, the alignment tool and apparatus 10 is mounted to the fuselage interior skin, generally designated 40, via the vacuum plates 22 (vacuum plate 24 not pictured), while the fastening member 34 is attached to a floor joist or beam 42. In the embodiment depicted, the fastening member 34 is utilized in combination with a support or stanchion 44, as previously discussed in connection with one of the embodiments encompassed by the present invention.

During operation of the embodiment of the alignment tool apparatus depicted in FIG. 3, pressurized air is provided to both the control box 36. As previously described, the pressurized air that enters the controls box 36, proceeds through an internal venturi vacuum generator, resulting in the generation of a vacuum force. The vacuum force is then provided to the vacuum plates 22, 24 via the conduits 39, which in turn enables the alignment tool to attach to the interior skin 40 of the fuselage. Meanwhile, pressurized air is simultaneously provided to the actuating member 30 via the control box 36. The air powers the actuating member 30 which in turn drives the shaft 32 to produce a controlled pushing and/or pulling force which is applied to the joist 42 via the shaft 32, fastening member 34 and stanchion 44.

During operation of the alignment tool and apparatus 10, the control box 36 enables the tool 10 operator to control the vacuum force being applied to the vacuum plates 22, 24 while also controlling the push and pull forces being applied to the floor joist or beam 42. Thus, the floor joist or beam 42 and interior skin 40 may positioned and flexed such that the DA holes align correctly. The control box 36 also enables the operator to preset push and pull forces, or record push and pull forces, allowing a consistent force to be applied to the work pieces at varying points and positions of the fuselage frame during assembly.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for aligning work pieces, comprising the steps of:
    mounting an alignment apparatus to a first work piece to be aligned, the alignment apparatus comprising:
        a base member;
        a first leg extending from the base member;
        a first vacuum plate connected to the first leg;
        a pneumatic cylinder having a pressure gauge and being mounted to the base member; and
        an attachment member connected to the pneumatic cylinder on an end thereof opposite the base member, wherein the step of mounting the alignment mechanism to the first work piece comprises applying a vacuum force to the first vacuum plate;
    attaching the attachment member to a second work piece to be aligned;
    presetting the pressure gauge to a preset force, the preset force being less than a maximum capacity of the pneumatic cylinder; and
    applying a pushing and pulling force to the second work piece reacted by the first work piece in a manner preventing the pneumatic cylinder from exceeding the preset force.

2. The method of claim 1, wherein the pneumatic cylinder includes a shaft extending therefrom, the attachment member being connected to the shaft, the step of applying the pushing and pulling force to the second work piece comprising:
    providing pressurized air to the pneumatic cylinder to produce one of pushing and pulling of the shaft.

3. The method of claim 2, further comprising the step of:
controlling the vacuum force being applied to the first vacuum plate while controlling the pushing and pulling of the shaft.

4. The method of claim 1, wherein the attachment member is configured as at least one the following: a planar piece, a vacuum cup, a clevis.

5. The method of claim 4, wherein the planar piece includes holes extending therethrough, the step of attaching the attachment member to the second work piece to be aligned comprising:
inserting at least one of bolts and pins through the holes in the planar piece to couple the attachment member to the second work piece.

6. A method for aligning work pieces, comprising:
mounting an alignment apparatus to a first work piece to be aligned, the alignment apparatus comprising:
a base member;
a first leg extending from the base member;
a second leg extending from the base member;
a first vacuum plate connected to the first leg;
a second vacuum plate connected to the second leg;
a pneumatic cylinder having a pressure gauge and being mounted to the base member and including a shaft extending therefrom; and
an attachment member connected to the shaft on an end thereof opposite the base member, wherein the step of mounting is achieved via the step of applying a vacuum force to the first and second vacuum plates;
attaching the attachment member of the alignment apparatus to a second work piece to be aligned;
presetting the pressure gauge to a preset force, the preset force being less than a maximum capacity of the pneumatic cylinder; and
applying a pushing and pulling force to the second work piece reacted by the first work piece in a manner preventing the pneumatic cylinder from exceeding the preset force.

7. The method of claim 6, further comprising the step of:
regulating the application of the vacuum force to the first and second vacuum plates.

8. The method of claim 6, wherein the step of applying the vacuum force to the first and second vacuum plates comprises:
generating the vacuum force by passing pressurized air through an internal venturi vacuum generator.

9. The method of claim 6, wherein the step of applying the pushing and pulling force to the second work piece comprising:
providing pressurized air to the pneumatic cylinder to produce one of pushing and pulling of the shaft.

10. The method of claim 9, further comprising the step of:
controlling the vacuum force being applied to the first and second vacuum plates while controlling the pushing and pulling of the shaft.

11. The method accordingly to claim 6, wherein the pneumatic cylinder is a dual action pneumatic cylinder.

12. The method of claim 6, wherein:
the first work piece is configured as a skin panel;
the second work piece being configured as one of a floor joist and a beam;
the step of applying the pushing and pulling force to the second work piece comprising:
positioning the skin panel in relation to one of the floor joist and the beam.

13. The method of claim 12, further comprising the step of:
controlling the vacuum force being applied to the first and second vacuum plates while positioning the skin panel in relation to one of the floor joist and the beam.

* * * * *